United States Patent [19]

Schatz et al.

[11] Patent Number: 4,928,648

[45] Date of Patent: May 29, 1990

[54] METHOD OF OPERATING AN IC ENGINE AND AN IC ENGINE FOR PERFORMING THE METHOD

[76] Inventors: Oskar Schatz, Waldpromenade 16, D-8035 Gauting; Georg Mehne, Altenberg 26, D-7162 Gschwend; Thomas Steidele, Hauzenbergerstrasse 29, D-8000 Munich 21, all of Fed. Rep. of Germany

[21] Appl. No.: 267,173

[22] Filed: Nov. 4, 1988

[51] Int. Cl.$^5$ .................. F02D 31/00; F02M 51/00; F02B 33/00; F02B 29/00
[52] U.S. Cl. .................. 123/403; 123/478; 123/559.1; 123/432
[58] Field of Search .............. 123/403, 559.1, 478, 123/432

[56] References Cited

U.S. PATENT DOCUMENTS

| | | | |
|---|---|---|---|
| 4,452,203 | 1/1984 | Oshika et al. | 123/403 |
| 4,484,556 | 11/1984 | Okimoto et al. | 123/432 |
| 4,492,203 | 1/1985 | Yutaka | 123/478 |
| 4,633,844 | 1/1987 | Okimoto | 123/559.1 |
| 4,704,682 | 12/1987 | Kato | 123/559.1 |
| 4,796,584 | 1/1989 | Gato et al. | 123/403 |

Primary Examiner—Raymond A. Nelli
Attorney, Agent, or Firm—Harness, Dickey & Pierce

[57] ABSTRACT

For charging the combustion chambers (10) provided with an inlet (14) and an outlet (16) valve of an IC engine of the piston type there is a charger (20) producing a continuous pressure and pumping into a storage space (28). In a way dependent on the ignition frequency of the associated combustion chambers (10) an air control valve (34) is opened and closed which is arranged between the storage space (28) and an inlet duct (36) leading to the inlet valve (14) of these combustion chambers (10). The phase relationship of the valve (34) to the inlet valve (14) may be changed in a way dependent on the required manner of operation of the engine between a position concentrating the air supply from the storage space (28) on the start of inlet and a position concentrating the supply on the end of inlet to such combustion chambers (10), each duct (40) supplying each combustion with non-compressed charge being shut off on the side of the combustion chamber to be supplied.

34 Claims, 9 Drawing Sheets

METHOD OF OPERATING AN IC ENGINE AND AN IC ENGINE FOR PERFORMING THE METHOD

The invention relates to a method for the operation of an IC engine of the piston type, more particularly a reciprocating engine, in the case of which each combustion chamber is connected via at least one inlet valve operated in step with the piston motion with an inlet duct, with a charger producing a continuous pressure and arranged to pump into a storage space, and an air control valve arranged between the storage space and each inlet duct and which opens and closes in accordance with the ignition frequency of the associated combustion chambers, and the phase relationship between the middle of opening of the air control valve and the in-phase state with the middle of opening of the inlet valve which is respectively being opened prior to the middle of opening thereof is able to be shifted, and to an IC engine for performing the method.

In the development of automobile engines and more especially of private car engines, there are presently essentially four design aims, that is to say a high power in order to reach high speeds, cultivated running at low speeds of rotation, and more especially a high torque and elastic response, low contamination of the environment in connection with mileage per gallon, emission of exhaust gas and noise and low costs.

In some cases these aims may be pursued jointly, i.e. they are not antagonistic to each other; as an example the reduction of road resistance and weight both lead to an increase in mileage and a reduction in exhaust emission. On the other hand exhaust gas catalysts decrease mileage and reduce the elasticity of the engine and the maximum power.

The measures for reducing the vehicle weight and air resistance of vehicles are of special importance, because this leads to a strong incentive as regards bulk and weight of the engine. Furthermore, owing to the increasingly competitive situation there is a considerably pressure on costs.

A solution to these problems is being increasingly sought in charging the engine, more especially by the use of an exhaust gas driven turbo charger. Owing to the conflict of interests between in the aims of development and owing to the different operational characteristics of charging devices and IC engines the solutions produced are only optimum to a partial extent. For instance, by the use of an exhaust gas turbo charger it is generally possible as a rule to meet the requirement for a low engine weight and a low overall size and also the requirement for a high power and maximum speed. The potential for possible improvements as regards exhaust gas emission and mileage is in this respect not utilized and cultivated running at low speeds is sacrificed. The torque is then too low at low speeds of rotation and the engine responds to changes in loads with a marked delay.

The development of the turbocharger is now directed towards combatting low torques at low speeds and slow response by using chargers, which attain their optimum operating point at low speeds of rotation, this leading to excessive charger energy at higher speeds of rotation. This energy is then discharged into the surroundings in the form of impeded exhaust gases or excessive charged air through so-called blow-off valves. It is only in a very narrow operating range that the exhaust gas turbocharger is able to supply the engine with a suitable amount of air, while at low speeds of rotation there is a shortage of air, because insufficient charger energy is available and at higher speeds of rotation there is an excess of energy, which remains unused. When the load is increased there is also a shortage of charger energy.

All charger devices produced on a substantial scale have the disadvantage that they operate on the so-called supercharging principle, in accordance with which a constant pressure mass air flow is produced and supplied to the engine. On opening the inlet valve of an engine cylinder the air flows at a more or less constant pressure into the cylinder and forces the piston downwards. When this is done work is transferred from the air to the piston, which energy has previously been supplied in the charger. The recovery of this energy takes place with losses so that it is not economic to supply such energy to the air, if this energy is not able to be compensated for by the recovery of waste energy which would otherwise be lost. The pumping work imparted to the charging air is many times greater in amount than the compression work required for the producing the charging effect, as is explained for instance in the European patent application No. 0 126 405. For instance in the case of an air compression of 25% (with an increase in pressure of around 0.4 bar) the pumping work in the case of the supercharging method will be around 10 times as high as the compression work. In operating ranges with a shortage of air it is thus possible to achieve an improvement if the charger energy present is mainly converted into compression work and the performance of pumping work is largely avoided. This is possible with postcharging as described in the said European patent application No. 0 126 405, in which towards the end of the induction stroke of the engine piston compressed charging air is introduced into the engine cylinder. The SAE paper no. 851,523 "A NEW TYPE OF MILLER SUPERCHARGING SYSTEM FOR HIGH SPEED ENGINES" refers to the possibility of concentrating the supply of the compressed charging air at the start of the induction phase of the engine cylinder, this being below referred to as precharging. In this respect if there has been a previous cooling of the charging air by expansion of the air in the engine cylinder to the desired pressure volume it is possible to attain an additional cooling effect, which has a positive influence on the combustion and in the case of a diesel engine causes a reduction in soot formation and NOx formation, and in the case of a gasoline engine reduces NOx formation and the inclination to knock. Furthermore, in the case of other types of engines an increase in power is optionally possible.

The present invention is based inter alia on the discovery that precharging additionally offers the possibility of returning energy, which would otherwise be lost, to the engine in the form of positive charge exchange work.

There are various methods of charging which are to be regarded as optimum in a given operational situation taking into account the given operation requirements.

The object of the invention is to so develop the initially mentioned method that in all operational conditions of the engine in accordance with the specifically selected aim for optimization a charging method in accordance therewith is made available which while still being reliable and involving minimum costs achieves an optimum balance, for instance, between engine power, torque, more especially at low speeds of rotation, and mileage and emission of contaminants taking into account the respective aim of optimization. The invention is also to provide an IC engine for performing the method.

In accordance with the invention the phase relationship between the air control valve and the inlet valve is adjusted dependent on the desired manner of operating the engine between a limit state concentrating the air availability from the storage space on the start of inlet and a limiting state concentrating this availability of air on the end of inlet and a duct supplying each combustion chamber with uncompressed air is shut off in the case of a gage pressure on the side of the combustion chamber.

This makes it possible to perform not only the charging method in accordance with the so-called supercharging principle but also the precharging method with the supply of compressed charging air at the beginning of the induction phase as well as the postcharging involving the supply of compressed air at the end of the normal induction phase.

There is the possibility of operating diesel engines in the upper load range in the postcharging range so that owing to the extensive availability of air the formation of soot is reduced without there being an increase in fuel consumption tied to the supercharging.

Preferably the duration of opening of the air control valve is equal at the most to approximately the duration of opening of the inlet valve or, respectively, the inlet valves.

In accordance with an advantageous development the duration of opening of the air control valve may be shortened with an increase in the phase deviation between the air control valve and the inlet valve in order to enhance the concentration of the air availability from the storage space towards the start of inlet.

In order to perform the method use may be made of an IC engine of the piston type with at least one combustion chamber, which is connected via at least one inlet valve with an inlet duct, with a charger continuously producing pressure and whose pressure side is connected with a storage space, with an air control valve between the storage space and each inlet duct, whose drive is so designed that it opens and closes at the ignition frequency of the associated combustion chambers and with a device for modifying the phase relationship between the inlet valve and the air control valve by shifting the middle of opening of the air control valve from the in-phase state with the middle of opening of the respectively opening, associated inlet valve prior to the middle of opening thereof, the IC engine being so designed in accordance with the invention that the device for modifying the phase relationship is able to shift the middle of opening of the air control valve to a point behind the middle of opening and each combustion chamber is able to be supplied with non-compressed charge via a duct which is able to be shut off by a valve and bypasses a compressor branch comprising the charger, the storage space and the air control valve, and preferably each inlet duct is connected with a duct (40) bypassing the compressor branch.

Preferably the device for modifying the phase relationship comprises a computer, whose inputs are connected with a program memory and sensors for responding to the operational data of the engine and/or at least one control member for the input of control commands and whose output is connected with a servo device for the air control valve, the program memory containing, in accordance with a particularly convenient form of the invention, selectable programs. This makes it possible, in accordance with the optimization aim as determined by the program selection, for the computer to take into account the instantaneous operational situation as detected by the sensors, of the engine and to accordingly select the charging method, which best complies with the optimization aim taking into account the control command supplied via the control member, as for instance the accelerator pedal of a motor vehicle.

Preferably the sensors are arranged on the combustion chamber and/or on the storage space and are suitable for responding to the operational state of the engine or, respectively, the pressure and temperature in the storage space.

Preferably as well the inlet side of the charger and the duct bypassing it are connected together upstream from the valve shutting off this duct.

In order to make possible the smoothest possible transition between the different charging methods the phase relationship between the inlet valve and the air control valve may be arranged to be steplessly adjustable.

The duration of opening of the air control valve is preferably equal at the most to the duration of opening of the inlet valve, as is necessary for conventional supercharging.

A very advantageous embodiment is so designed that upstream from the air control valve there is a charging air cooler so that increases in power and improvements in the exhaust gas become possible, something that has already been explained in connection with the concentration of the air availability from the storage means at the start of inlet. The advantages of charge air cooling may also be used if the desired final pressure in the engines cylinder in the induction phase is equal to the ambient pressure. If in such an operational state either for reasons of utilization or, respectively, recovery of present charger drive energy or for reasons of improving the combustion by greater cooling of the air control valve is shut so early that the pressure in the engine cylinder sinks to under atmospheric pressure prior to reaching the lower dead center position, the duct bypassing the compressor branch may be used to draw in atmospheric air. This manner of operation may be an advantage both in gasoline and also in diesel engines in order to reduce the emission of exhaust gas and to increase mileage, but also to increase the engine power without loading the engine mechanically and thermally more than is the case with simple induction operation.

A particularly simple form of the invention is one in which the duct bypassing the compressor branch comprises a directional valve, which only permits flow in a direction towards the inlet valve. This means that atmospheric air is always drawn into the inlet duct when there is vacuum therein.

In order to ensure rapid opening of the air control valve to its full opening cross section so that the amount of air being transferred during the time of opening of the air control valve is increased, there are further convenient features such that the opening frequency of the air control valve is the same as the ignition frequency of the engine or a multiple of such frequency.

It is however also possible to so design the engine in order to regulate the power so that the interval between the opening times of the air control valve is able to be adjusted between the interval of the engine times of the inlet valve of the engine and a multiple thereof.

However, it may also be desirable to operate in a manner in which the above mentioned concentration of the air availability from the storage space is at the start of inlet, this in what follows being referred to as precharging for short and in this case with the air control valve closed during the induction stroke of the engine piston there is to be a decrease in the pressure in the engine cylinder under atmospheric pressure in order to cause cooling by expansion of the charge. In order selectively to make possible such a manner of operation, it is convenient to provide a controlled valve for the duct bypassing the compressor branch, such valve preferably being able to be shut in a way dependent on the position of the air control valve.

In the case of one preferred design each inlet duct is provided with a valve shutting off the connection to the duct bypassing the compressor branch, and for limiting the amount of dead space preferably the valve adapted to shut off the duct bypassing connection to the compressor branch, the associated air control valve and the inlet valve or, respectively, the inlet valves of the associated combustion chambers are placed in close proximity to each other.

In this respect, in accordance with another convenient design the duct bypassing the compressor branch may comprise a valve able to be actuated jointly with the air control valve, the two valves also being able to be united as a multiway valve.

In accordance with a particularly preferred design in connection with a design with a directional valve the multiway valve comprises a rotor which is enclosed by a valve housing, is designed in the form of a body of revolution, is able to be driven continuously in step with the crank shaft and has a connecting duct opening towards the housing, the connecting duct in the valve housing being provided with ports, placed sequentially in the circumferential direction, for the storage space and for the inlet duct.

In the case of a design with a controlled valve in the duct bypassing the compressor branch, which is united with the air control valve as a multiway valve, an advantageous design is one in which the multiway valve comprises a rotor which is enclosed by a valve housing, is designed in the form of a body of revolution, is able to be driven continuously in accordance with the rotation of the engine crank shaft and has a connecting duct opening towards the housing, the connecting duct in the valve housing having ports, arranged in sequence in the direction of rotation, for the storage space, the inlet duct and the duct bypassing the compressor branch, and the port for the duct bypassing the compressor branch comprises a shut off means. This shut off means may preferably be in the form of a directional valve for shutting off one direction of flow.

If the air control valve only controls the entry of the compressed charging air into the inlet duct, it is then possible to use an adjustable opening port edge of the connection between the storage space and the inlet duct the start of charging may be affected and adjustment of the closing port edge of this connection may be used to affect the end of charging. It is convenient if the closing port edge of the connection between duct bypassing the compressor branch and the inlet duct is made adjustable in order to control the end of induction and if the opening port edge of this connection is made adjustable in order to be able to vary the start of induction.

In the case of valve designs with a continuously rotating rotor a further convenient design is one in which the phase relationship between the valve opening times and the crank shaft is able to be varied by adjustment of the setting of the rotor in relation to the valve housing.

Another possible design using a multiway valve is one in which two continuously driven rotors turned by the rotation of the engine crank shaft which are designed as bodies of revolution are provided with a connecting duct and are rotatably mounted in a valve housing, one connecting duct in an open position thereof connecting ports for the storage space and the inlet duct and the other connecting duct in its open position connecting together an inlet and an outlet for the duct bypassing the compressor branch, the phase relationship of the rotors being able to be adjusted and the phase relationship between the valve opening times and the engine crank shaft being able to be changed by adjustment of the rotors in relation to the valve housing.

Preferably the maximum speed of rotation of the rotor or, respectively, the rotors is such that for two strokes of the associated engine cylinder or, respectively, the associated engine cylinders the valve is opened once.

In accordance with a particularly advantageous design it is possible for the speed of rotation of the rotor or, respectively, of the rotors to be selectively halved in steps so that there is the possibility of not loading the engine cylinders during each cycle and the charging operation is only performed in intervals adapted to the power requirement.

In the case of a four cylinder in-line four stroke engine a particularly simple design is possible in which there are three inlet ducts of which one inlet duct is jointly associated with the two middle cylinders. Such a design makes it possible to dispense with one control valve and possibly a separate directional valve, because on the one hand there are only comparatively short paths to be covered from a valve jointly associated with the two middle cylinders and on the other hand the induction phases of the two cylinders do not come directly one after the other.

In accordance with a further useful form of design having a directional valve in the duct bypassing the compressor branch the air control valves of at least one set of inlet ducts of an engine have a common, tubular rotor which is able to turn in a tubular housing, and is able to be driven by the rotation of the crank shaft, and the interior space thereof is connected with the storage space, on the housing the inlet ducts open with a mutual offset in the axial direction, each inlet duct on the rotor is provided with a valve port and these valve ports are offset in accordance with the ignition sequence in the peripheral direction and the phase relationship between the rotor and the crank shaft is able to be varied. In this design, in which preferably the access of the compressed charging air to all the inlet ducts of an engine is controlled by a common rotor, the interior space of the rotor is continuously in communication with the storage space via only one single port so that the result is a particularly simple arrangement. The inlet ducts extending from the housing towards the engine cylinders are respectively separately connected with the duct bypassing the compressor branch.

The advantage of the method in accordance with the invention may also be achieved if the duct for the non-compressed charge does not open into the air inlet duct leading to the combustion chamber from the charger, and instead for the compressed charging air and for the non-compressed charging air there are separate inlet ducts with inlet valves on the combustion chamber, that is to say on the engine cylinder. In this respect an air stroking valve is arranged in the inlet duct for the compressed charge, while in the inlet duct for the non-compressed charge there is a valve, which closes in response to gage pressure on the side of the combustion chamber so that escape of the compressed charge supplied to the combustion chamber via the other inlet duct is precluded. Owing to the additional inlet valve necessary in the case of separate inlet ducts and mounted on the engine cylinder however the described design is preferred with a common inlet duct for non-compressed and compressed charge.

Working examples of the invention will now be described with reference to the drawings.

Figure 1:
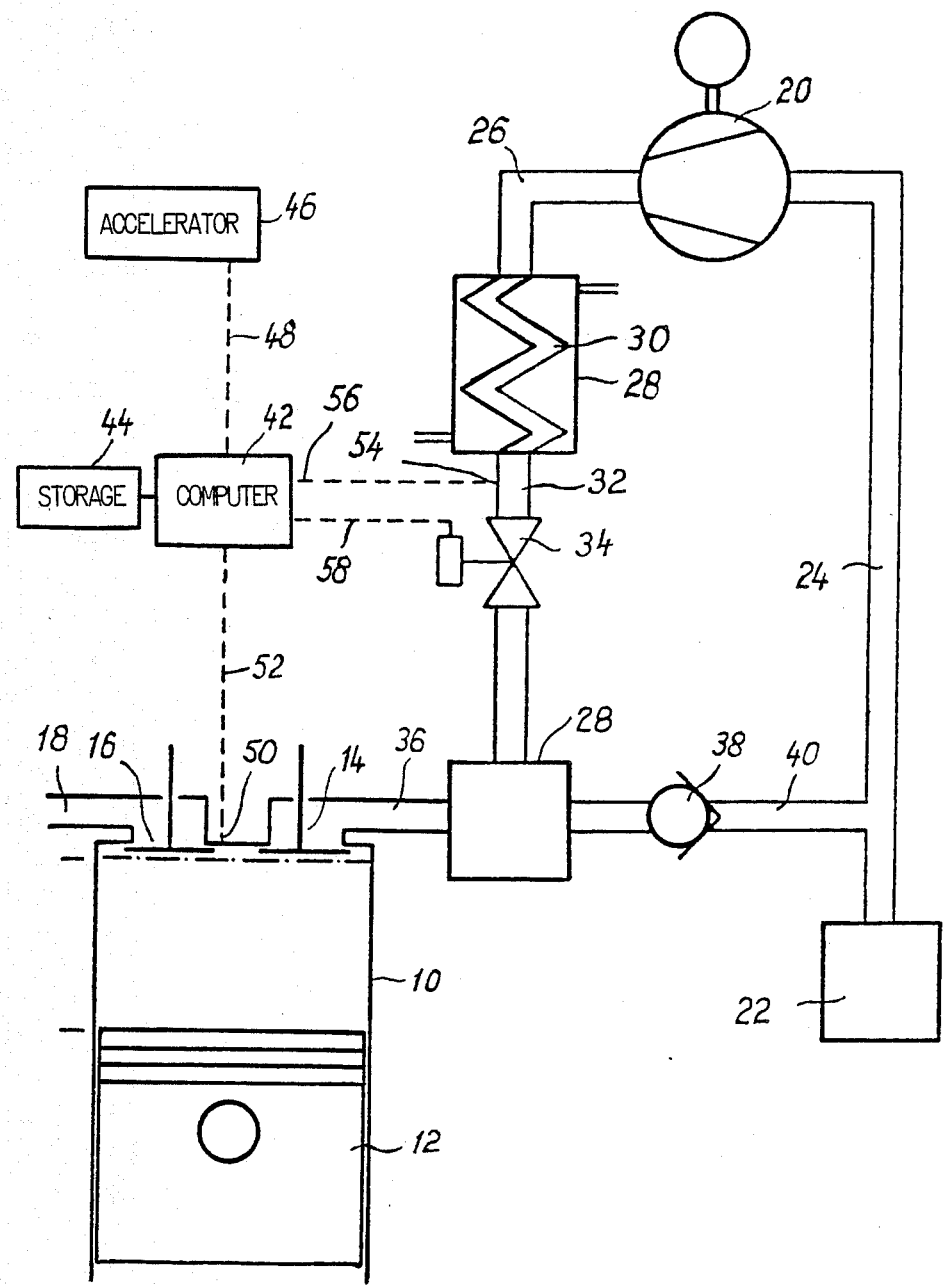
FIG. 1 is a diagrammatic view of first working example of an IC engine designed in accordance with the invention, same showing only one cylinder.

FIG. 1 shows one cylinder 10 of a four stroke IC engine with a reciprocating piston 12. The cylinder 10 possesses an inlet valve 14 and an outlet valve 16, which adjoins an exhaust gas duct 18. A turbo charger 20 is able to be driven by the exhaust gas and it is supplied with air to be compressed via an air filter 22 and a duct 24. The air compressed by the turbo charger 20 passes via a duct 26 to a storage means 28, which in the present case is shown in combination with a charging air cooler 30. A duct 32 leads from the charger 28 to an air control valve 34, which is adapted to control the access of the compressed charging air from the storage means 28 into the inlet duct 36 leading to the inlet valve 14. The inlet duct 36 is directly connected with the air duct 24 leading from the air filter 22 to the charger 20, the directional valve, as for instance a check valve flap, is so arranged that a flow bypassing the turbo charger 20 is only able to move from the air filter 22 to the inlet duct 36. In order to make it possible to take into account engine operational conditions in which the supply of induced air is inappropriate, the duct may also be shut off completely for the duration of such an operational state, for which purpose it is either possible to provide a separate shut off valve or the directional valve 38 may be locked in the closed position.

The operation of the air control valve 34 is undertaken in accordance with a computer 42, which is provided with a program memory 44 so that there is a possibility of running the computer 42 with one of a number of different programs stored for use under different operating conditions. The computer 42 then processes both automatically supplied information concerning the operational state of the engine and also external control commands as are supplied for example in the case of a motor vehicle by changing the position of the gas pedal. In the diagrammatic view of FIG. 1 46 denotes such a gas pedal, which is connected via a connection 48 with the computer 42. 50 denotes a sensor on engine, which is connected via a connection 56 with the computer 42. The computer 42 may in this manner be provided not only with information concerning the condition in the engine combustion chamber but also for instance as regards the pressure and temperature of the stored charging air.

The computer 42 may be utilized in order to control the manner of operation of the engine in accordance with different optimization targets, that is to say in accordance with the selection of the one or the other program taken from the program store 44. In accordance with the information supplied from the computer 42 the computer will then so affect the timing of the air control valve 34 that the supply of compressed charging air is either concentrated at the start of inlet into the engine cylinder 10, this being termed precharging or the compressed charging air is supplied during the full opening time of the inlet valve 14 of the engine cylinder 10, this being the same as conventional supercharging. In the case of the working example of FIG. 1 the directional valve 38 is then closed by the gage pressure obtaining in the inlet duct 36 on the opening of the air control valve 34 so that escape of the compressed charging air is prevented. On the other hand non-compressed air is drawn in via the directional valve 38 when the engine piston 12 performs its intake stroke when the inlet valve 14 is open and the air control valve 34 is closed.

Figure 2:
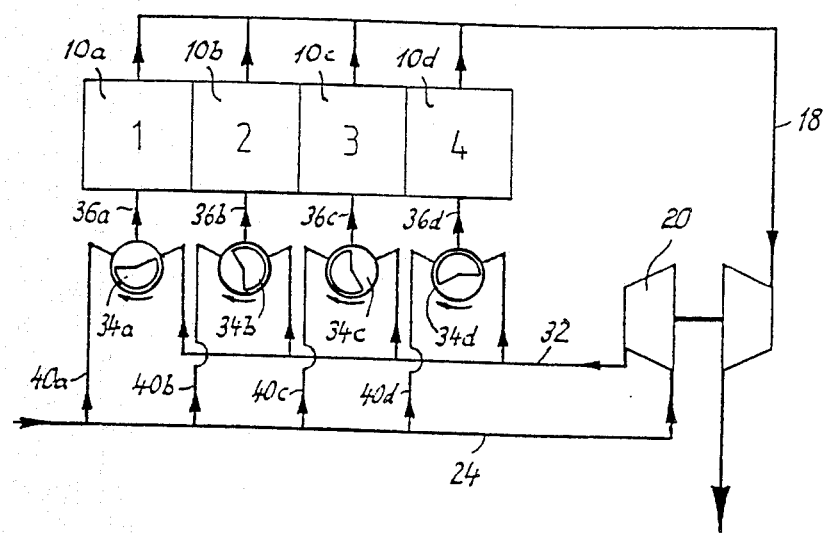
FIG. 2 is a diagrammatic view of another working embodiment an IC engine in accordance with the invention, taking a four cylinder engine as an example.

FIG. 2 shows that in the case of a four cylinder engine each of the four cylinders 10a, 10b, 10c and 10d has a respective air control valve 34a, 34b, 34c and 34d, in which case here the air control valve 34a through 34d are designed in the form of three way valves, of which each has two inlets, which are connected with the duct 32 coming from the turbo charger 20 for compressed air and on the other hand via a respective branch duct 40a through 40d with the duct 24, leading to the charger 20 for non-compressed air, and an outlet, which is respectively connected with an inlet duct 36a through 36d respectively connected with one of the cylinders.

FIG. 2 has been simplified by not showing the storage means 28 with the charging air cooler 30 between the turbo charger 20 and the air control valves 34a to 34d.

Figure 3:
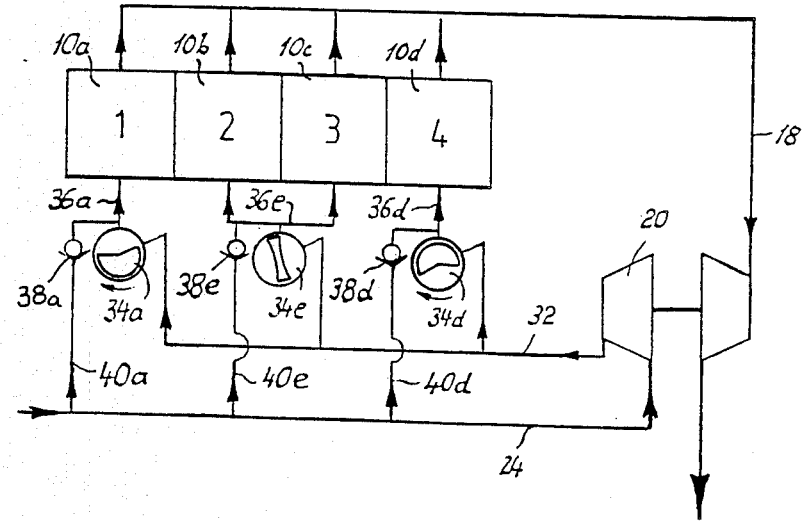
FIG. 3 is a similar diagrammatic view of a further IC engine in accordance with the invention in the form of a four cylinder in-line engine.

Since the 1-3-4-2 ignition sequence of a four cylinder in-line engine means that the strokes of the two middle cylinder 2 and 3 do not occur directly one after the other, it is possible for them to have a common air control valve 34e, as is indicated in FIG. 3, more especially since the path from the latter to the two middle cylinders via a common inlet duct 36e is relatively short. The branch ducts 40a, 40e and 40d are connected via check valve flaps 38a, 38e and 38d. A corresponding connection of the branch ducts 40a to 40d may also be selected alternatively in the design of FIG. 2. The rotor 62 of the valve 34c is the same as the design of FIG. 7 with two sections 64 and 65.

The design in accordance with FIG. 3 has a closely adjacent arrangement of the engine inlet valves 14a and 14d and, respectively, of the group of inlet valves 14b and 14c near the associated air control valves 34a, 34d, 34e and check valve flaps 38a, 38d and 38e so that the dead spaces associated with the individual engine cylinders may be reduced to a minimum and the accuracy of control of charge change may be improved.

Figure 4:
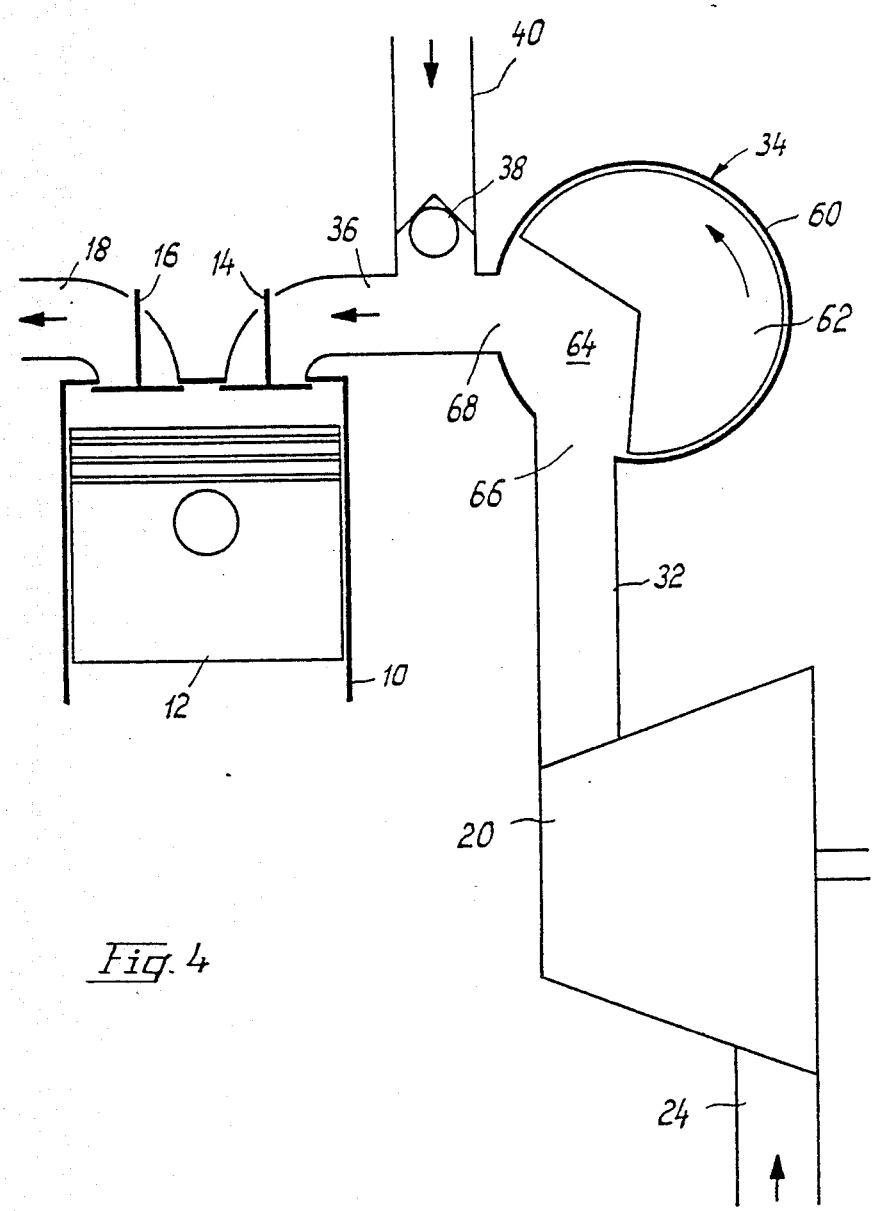
FIG. 4 shows a valve arrangement with a directional valve separated from the air control valve for the supply of non-compressed charge, a diagrammatic view.

The design shown in FIG. 1 with a directional valve 38 in a branch duct 40 opening directly into the inlet 36 is shown in FIG. 4 in a somewhat different view, the function of the air control valve 34 now being explained in detail. In order to simplify the view in this case as well the storage means 28 with the air cooler 30 between the charger 20 and the air control valve 34 is omitted. If the duct volume is sufficient it would also be possible for the duct connection between the charger 20 and the air control valve 34 to serve as a storage space.

The air control valve 34 shown in FIG. 4 has a valve housing 60, in which a rotor 62 continuously rotates in step with the rotation of the engine crank shaft. This rotor 62 is designed in the form of a body of revolution and has a sector-like cutout 62, which at a given angular position of the rotor 62 permits flow between in the inlet slot 66 and the outlet slot 68. As will be clearly seen in FIG. 4, the connection between the inlet slot 66 and the outlet slot 68 is maintained while the rotor 62 performs a turning motion of about 90°. If the rotor 62 is driven at half the speed of the engine crank shaft, this angle of 90° will correspond to a crank shaft rotation of 180°. Given the right phase relationship between the rotor 62 and the engine crank shaft it is possible for the connection between the inlet duct 36 and the air compressed by the charger 20 to be maintained during a full suction stroke of the engine piston, as is needed for conventional supercharging. If the phase relationship between the rotor 62 and the engine crank shaft is varied so as to depart from the relationship for supercharging in such a manner that the rotor 62 is ahead of the crank shaft, for instance so that the middle of opening of the air control valve 34 coincides with the start of opening of the inlet valve 14, the result is so-called precharging, in which the air supply by the charger 20 is concentrated at the start of inlet of the inlet valve 14. The air control valve interrupts the connection of the inlet valve 36 with the charging air compressed by the charger 20 an ample time prior to the closing of the inlet valve 14, as for instance in the middle of the induction stroke of the piston 12. In the design of FIGS. 1 and 4 the vacuum in the inlet duct 36 will open the directional valve 38 so that non-compressed air will be drawn into the inlet duct 36 and through the inlet valve 14 into the engine cylinder 10 until the inlet valve 14 closes.

If the phase relationship between the rotor 62 and the crank shaft is changed in the opposite direction, then the connection between the compressed charging air and the inlet duct 36 will be opened via the air control valve 34 only some time after the opening of the inlet valve 14 so that the piston 12 will initially draw in non-compressed air via the directional valve 38 before at the end of the induction stroke of the piston 12 the air control valve 34 will open and in addition to the air which has so far been drawn in from the charger 20, compressed air will flow into the cylinder 10. For instance, it is possible for the phase displacement to be made so large that the air control valve 34 is only opened a short time prior to the closing of the inlet valve 14 so that even in the case of a comparatively large charger capacity, as is to be expected at low speeds of rotation, the charging energy may be converted into compression work.

In the design in accordance with FIGS. 1 and 4 air is always drawn in via the branch duct 40 when the inlet valve 14 is opened and the air control valve 34 is closed. In the case of such precharging it may however be desirable, after the closing of the air control valve 34, to prevent the induction of external air via the branch duct 40 in order to cool the compressed air, which is in the engine cylinder 10 and comes from the charger, by expansion. This may be done for instance by modifying the arrangement shown in FIG. 4 so that there is a shut off valve in the branch duct 40, such valve being closed in this mode of operation.

Figure 5:
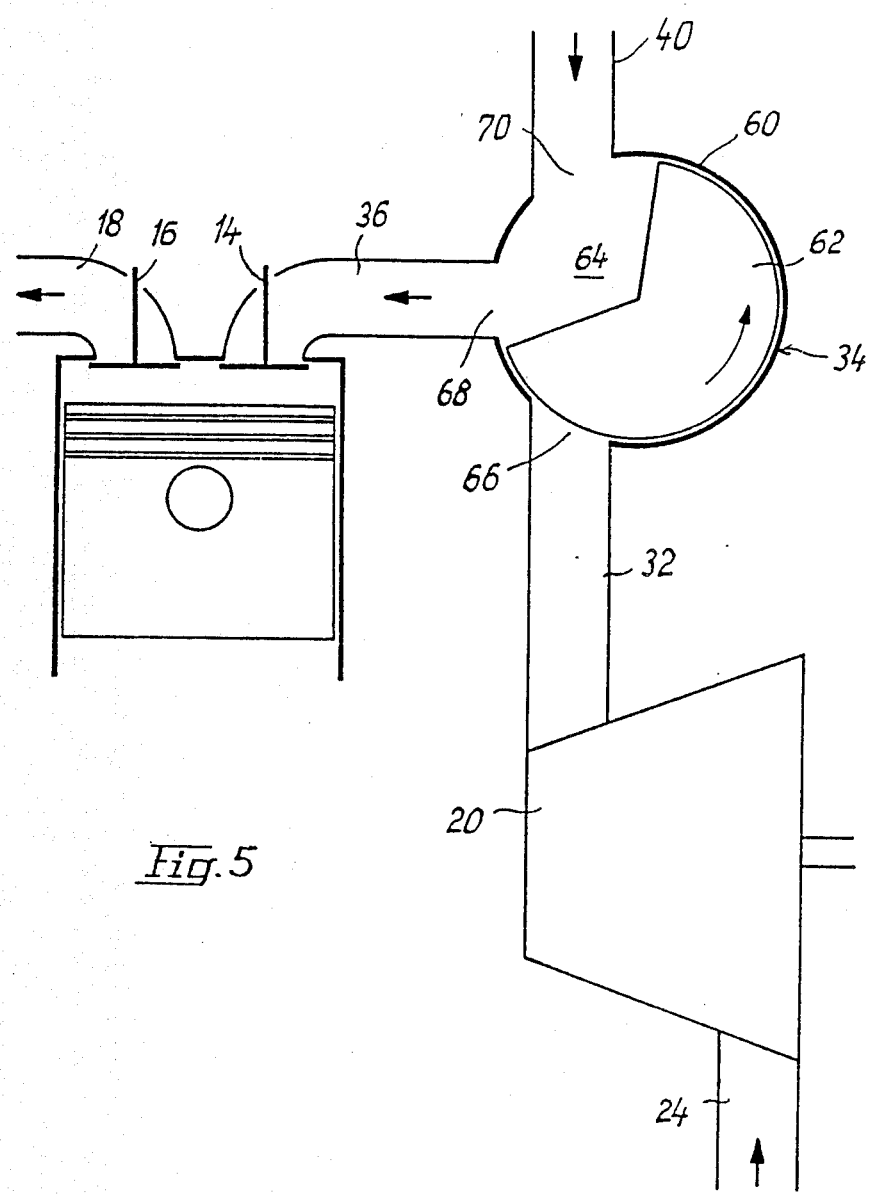
FIG. 5 is a view, similar to that of FIG. 4, of an example of the invention, in which the supply of compressed and non-compressed charge is controlled by a common valve.

FIG. 5 shows a modification in which the branch duct 40 is not directly placed in the inlet duct 36 but is connected via a slot 70 with the valve housing 60 and the opening and closing of the branch duct 40 is controlled by the rotor 62 in this manner. The directional valve 38 in the branch duct 40 is not required in this design. As will be seen from FIG. 5, the opening phase of the branch duct 40 in relation to the inlet duct 36 is in each case directly after the opening phase for the charging air compressed by the charger 20. In the case of supercharging during the opening phase of the branch duct 40 the inlet valve 14 on the engine is closed again so that only compressed air passes into the cylinder 10. In the case of precharging the connection between the branch duct 40 and the inlet duct 36 remains closed, when the air control valve 34 has interrupted the connection, serving for the supply of compressed air, between the slot 66 and the slot 68. In this design precharging is only able to be performed in connection with the expansion cooling.

Figure 6:
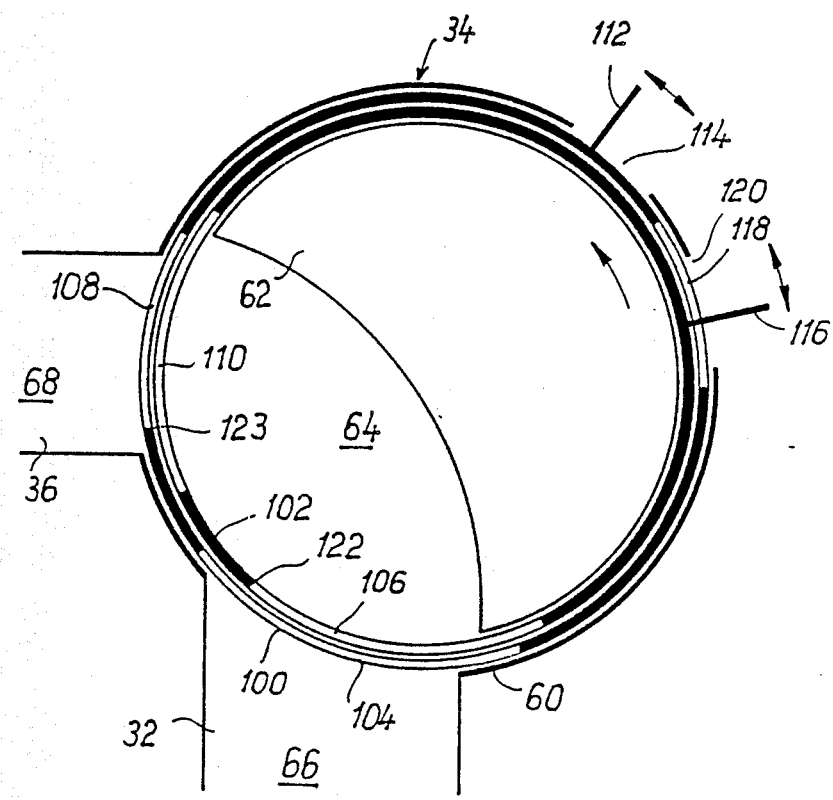
FIG. 6 shows a modified form of the air control valve of FIG. 4.

FIG. 6 shows a modification of the air control valve shown in FIG. 4, which valve only has the two connections 66 for the compressed charging air towards the inlet duct 36. Within the valve housing 60 there is in this form of the invention an outer baffle ring 100 placed concentrically to the valve housing 60 and an inner baffle ring 102. In the two baffle rings 100 and 102 there are windows 104 and, respectively, 106 associated with the slot 66 in the housing and the windows 108 and, respectively, 110 associated with the slot 68. The two baffle rings 100 and 102 may both be set independently from each other and also in the same direction of rotation jointly with each other, this being indicated diagrammatically by the servomembers 112 and 116. The servomember 112 of the external baffle ring 100 extends outwards through a slot 114 in the valve housing 60. The servomember 116 on the inner baffle ring 102 extends through a slot 118 on the outer ring 100 and a slot 102 in the valve housing 60.

The windows 108 and 110 extend through a sufficiently large angle in order to be able to keep clear the edge, placed opposite to the direction of rotor rotation, of the slot 68 leading to the inlet duct 36. The edge of the window 11 in the direction of the rotor is furthermore so arranged that it also keeps the slot 68 clear. The limit, placed in the direction of turning of the rotor 62 and serving as a closing edge 123, of the window 108 and the limit 122, placed oppositely to the direction of the rotor and serving as an opening edge, of the window 106 in the interior baffle ring 102 serve to change over the manner of operation between precharging charging and postcharging. If the closing edge 123 is moved into a position adjacent to the slot 68, the air control valve 34 will be closed before the engine inlet valve 14, this corresponding to precharging. If the opening edge 122 is moved into a position adjacent to the slot 66, the air control valve 66 will be opened later, this corresponding to postcharging. The limit of the windows 104 and 106 placed in the direction of the rotor are so arranged that they do not affect the opening cross section of the slot 66. It would be possible also to arrange the opening edge 122 and the closing edge 123 on a single baffle ring and adjust them in a ganged manner, in which case however it would then be necessary to have twice the displacement of this baffle ring. The motion of the rotor 62n is either produced by direct drive from the engine crank shaft or by a drive from the engine cam shaft.

Figure 7:
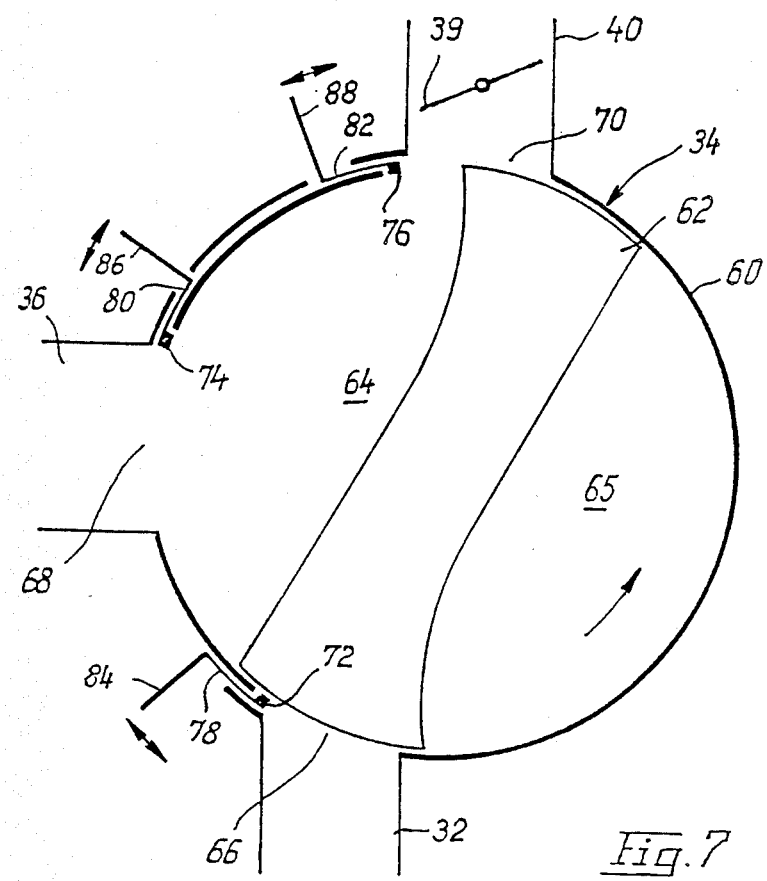
FIG. 7 shows a modified form of the air control valve of FIG. 5.

FIG. 7 shows a modification of the air control valve 34 seen in FIG. 5, in the case of which the branch duct 40 is connected with the air control valve 34. The opening edge 72 of the slot 66, the opening edge 74 of the slot 68 and the closing edge 76 of the slot 70 may in this case be set by independently moving slides 78, 80 and, respectively, 82, for which reason the slides are provided with servomembers 84, 86 and 88. The slide 78 may be used to change the start of charging. The slide 80 is used to change the start of induction and the slide 82 is used to change the end of induction from the branch duct 40.

In FIG. 7, unlike the case of FIG. 5, the rotor 62 is provided with a second cutout 65. As soon as the rotor 62 has turned the right distance and the connection between the slot 70 and the slot 68 is interrupted, the cutout 65 will be adjacent to the slot 68 and connects it with the slot 70. It is only in the case of the phase relationship of the rotor 62 corresponding to precharging in relation to the engine crank shaft the inlet valve 14 of the engine is open at this time so following the introduction of compressed charging air into the cylinder 10 at the beginning of the induction stroke of the piston 12 as yet non-compressed air may be drawn in from the branch duct 40. If now in this case however expansion cooling of the compressed charging air introduced by precharging into the engine cylinder 10, the branch duct 40 may be shut by a shut off valve 39 arranged in it.

Figure 8:
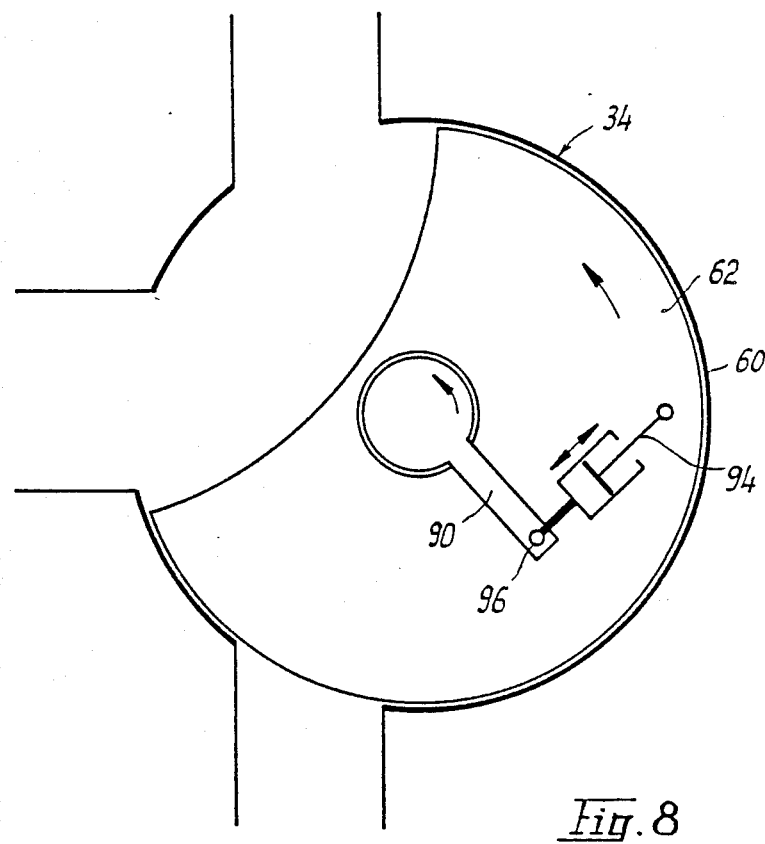
FIG. 8 is a diagrammatic view concerning the change in the phase relationship of the air control valve of FIG. 5 with the rotation of the engine crank shaft.

FIG. 8 shows, only by way of example, how the phase relationship of the opening phases of the air control valve 34 in relation to the position of the crank shaft of the engine may be modified. In the working example shown in FIG. 8 for this purpose a servomember 94, which may be hydraulically adjusted in length for instance, is provided which acts on a lever 90 pivoted concentrically to the rotor 62 and at the other end it acts on the rotor 62 so that the angular setting of the rotor 62 may be changed in relation to the lever 90. However it is also basically possible not to set the rotor 62 but to set the valve housing 60 in relation to the rotor 62.

Figures 9, 10, 11, 12:
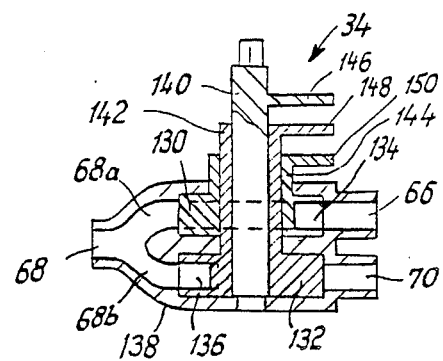
FIG. 9 is a diagrammatic axial section taken through an other working embodiment of an air control valve.
FIG. 10 is a diagrammatic view of the position of the air control valve of FIG. 9 at the point in time of opening of the air inlet valve and during precharging.
FIG. 11 shows the situation at the same point in time during supercharging.
FIG. 12 shows the corresponding situation during postcharging.

FIGS. 9 through 12 show a further modification of the air control valve 34. In this design there are two coaxial rotors 130 and 132 placed within the valve housing 138, the upper rotor 130 in the housing 138 having a port 66 leading to the storage means 28 and a branch 68a of a port 68 leading to the inlet duct 36. The lower rotor 132 in FIG. 9 is provided with a port 70, connected with the branch duct 40 and a further duct 68b is provided therefore from the port 68 leading to the inlet duct 36. The rotor 130 is provided with a connecting duct 134, the rotor 132 is provided with a connecting duct 136. In order to make the drawing clearer in FIG. 9 the ports 66 and 70 on the one hand and the port 68 on the other hand are spaced by 180°, while, as shown in FIGS. 10 to 12, these ports are offset by about 90° in relation to each other. For simplification as well in FIGS. 10 through 12 the two rotors 130 and 132 are not shown coaxially but, purely diagrammatically, offset from each other laterally.

The valve housing 138 has a drive shaft 140 extending through it which is driven in a way dependent on the rotation of the engine crank shaft, said shaft 140 being enclosed within a hollow shaft 142 connected with the rotor 132. On the hollow shaft 142 a further hollow shaft 144 is arranged rotatably which is connected with the rotor 130.

In FIG. 9 both the drive shaft 140 and also the hollow shafts 142 and 144 extend out of the valve housing 138 at the top thereof and are connected here with radially extending levers 146, 148 and 150, servomembers, which are not shown, being used for shifting the lever 148 and the lever 150 separately from each other in order to change the phase relationship of the rotors 130a and 132 independently from each other. The arrangement may however also be such that the lever 146 and the lever 140 are able to be shifted via the lever 148, suitable operation of the servomembers placed between the levers then making possible an independent phase shifting of the two rotors 130a and 132. The arrangement is furthermore such that in addition to the respectively independent change in the phase setting of the two rotors 130 and 132 in relation to the drive shaft 140 a joint change in the phase setting of the two rotors 130 and 132 in relation to the drive shaft 140 is possible.

In FIG. 10 the position of the two rotors 130 and 132 will be seen at the start of the engine induction stroke during so-called precharging. It is assumed that the drive shaft 140 is rotating at half the speed of the crank shaft. The connecting duct 134 extends over a sector of approximately 105° so that in the case of so-called supercharging the engine cylinder may be supplied with compressed charging air during the entire induction stroke from the storage means 28.

On opening of the engine inlet valve 14 the opening edge, see FIG. 10, of the connecting duct 134 will have already moved out far beyond the port 68a so that the connection between the port 66 and the port branch 68a will be interrupted after further rotation of the drive shaft 140 through about 50°, when the engine piston 12 has moved a little further than half the induction stroke. While via the connecting duct 134 and the inlet duct 36 compressed charging air is able to flow through the inlet valve 14 and the cylinder 10, the connection between the port 70 and the port branch 68b is shut. This connection is opened in the angular setting shown in FIG. 10 between the rotor 130 and the rotor 132, as soon as the connection between the port 66 and the port branch 68a closes so that following the precharging non-compressed air is able to flow into the engine cylinder 10 until the inlet valve 14 closes. However it will also be seen from FIG. 10 that the rotor 132 may be shifted so far in relation to the position shown here opposite to the direction of rotation that on the one hand it will already have interrupted the connection between the port 70 and the branch 68b when the inlet valve 14 opens and on the other hand it will keep this connection closed even during the entire duration of opening of the inlet valve 14 so that even a precharging without following induction of non-compressed air will be possible.

In FIG. 11 the drive shaft 140 assumes the same angular position as in FIG. 10 after in this case as well the time is adhered to at which the inlet valve 14 opens. The rotor 130 is offset in a direction opposite to the direction of rotation in relation to the drive shaft 140 so that it will just have cleared the connection between the port 66 and the port branch 68a. In the angular setting of the rotor 132 as well in relation to the rotor 130 is changed so that the connection between the port branch 68b is kept in existence as long as the inlet valve 14 remains open. Thus during the entire induction stroke of the piston 12 there is a supply of compressed charging air for so-called supercharging.

In FIG. 12 the rotor has been shifted even further against the direction of rotation in relation to the drive shaft 140, the rotor 132 having taken part in this shifting motion without changing its position in relation to the rotor 130. After the situation has been returned to with the inlet valve 14 open it will be seen that the connection between the port 70 and the port branch 68 has already been opened, while the connection between the port 66 and the port branch 68a is still interrupted. The piston 12 thus initially draws in non-compressed air. The two rotors 130 and 132 assume such an angular setting in relation to each other that the port 70 is shut off, when the port 66 is opened after rotation of the drive shaft 140 through about 75°, that is to say when the piston approaches the lower dead center position for so-called postcharging.

Any desired intermediate position may be set at any time.

Figure 13:
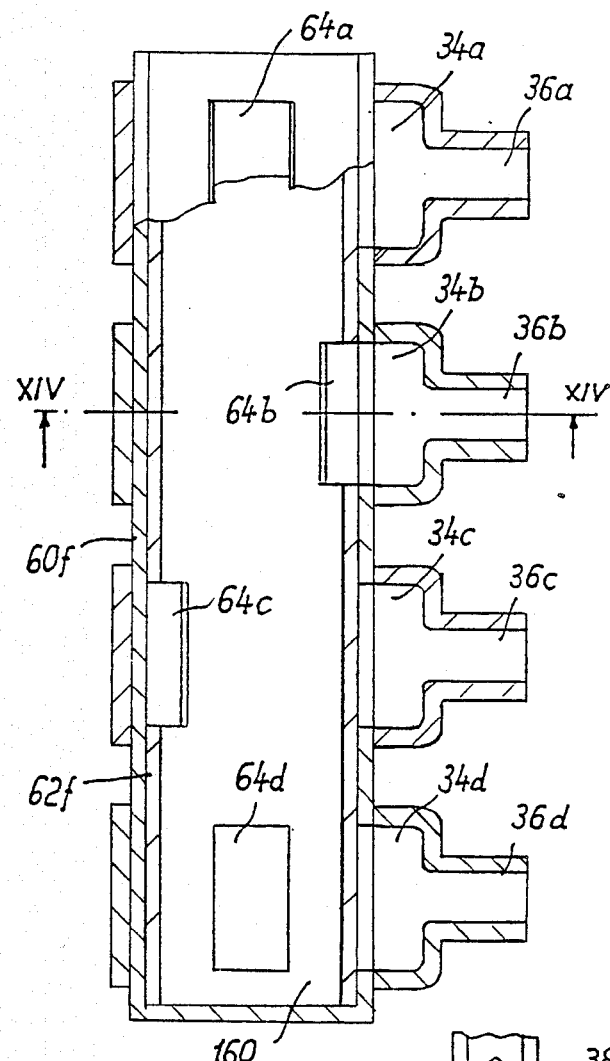
FIG. 13 is a diagrammatic axial section taken through a further valve arrangement for a four cylinder engine.
Figure 14:
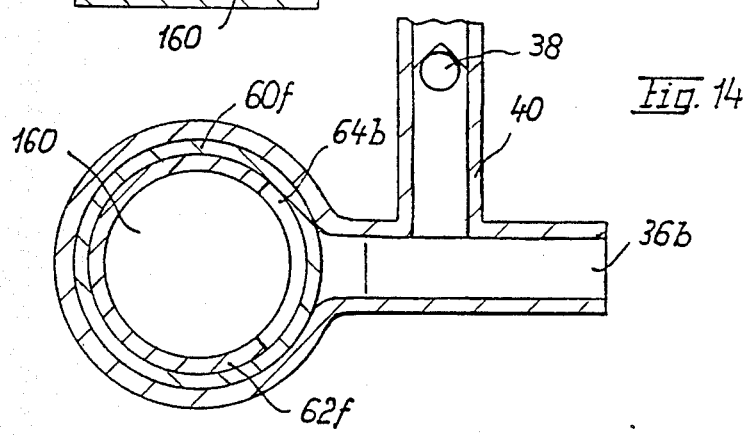
FIG. 14 is a section taken on the line XIV—XIV of FIG. 13.

In the design shown in FIGS. 13 and 14 the basis taken is the situation in the case of a four cylinder in-line engine without any desire to limit the invention to such a design, each engine inlet valve having an inlet duct 36a, 36b, 36c and 36d. The duct 40 bypassing the compressor branch 20, 28 and 34 (see FIG. 1) is in each case connected via a check valve flap 38 with each of the inlet ducts 36a through 36d. Each of the inlet ducts 36a to 36d is connected in the manner described with an air control valve 34a through 34d in order, in accordance with the ignition sequence, and the selected phase relationship of the compressed charging air from the storage means 28 to make possible the access of the compressed charging air from the storage means 28 to the individual engine cylinders. In the working example shown in FIGS. 13 and 14 these air control valves 34a to 34d are joined together as a common subassembly with a common rotor 62f, which is made in the form of a tube and is journaled in a common housing 60f. The rotor 62f is driven in accordance with rotation of the crank shaft, there being means, not shown in detail here, for shifting the phase relationship between it and the crank shaft. The individual inlet ducts 36a through 36d are offset axially in relation to each other and connected with the housing 60f. In a corresponding axial position there are valve openings 64a through 64d, associated with the inlet ducts 36a through 36d, and which are offset in the circumferential direction of the rotor 62f in accordance with the ignition sequence of the engine cylinders. The means for driving the rotor 62f and for resetting its phase, and the connection between the inner chamber 160 and the storage space 28 may be designed in any desired manner in a way familiar to those in the art so that same are not shown here.

In the example shown it is assumed that the rotor 62f is driven with half the speed of the crank shaft so that the rotor 62f performs a complete rotation while the instance in the case of a four cylinder in-line engine the engine runs through the ignition sequence 1-3-4-2 once. In a corresponding sequence the valve openings 64a, 64c, 64d and 64b are aligned with the ports of the inlet ducts 36a, 36c, 36d and 36b.

If the speed of the rotors 62 or 130 and 132 is reduced to a fourth of the crank shaft speed then each combustion chamber will only be supplied with charging air during each second stroke so that if there is a low power requirement and a constant speed of the engine the individual working stroke will take place with a higher degree of filling of the cylinders and thus with a better specific fuel consumption. If the power requirement is further decreased it is possible to halve the speed of the rotors again.

In order to simplify the account the text refers to compressed and non-compressed charging air. However, as will be seen by one trained in the art, it may also be a question of charging air mixed with fuel.

We claim:

1. An IC engine of the piston type, more particularly a reciprocating piston engine, with at least one combustion chamber (10), at least one inlet valve (14) with an inlet duct (36) coupled with said at least one combustion chamber, a charger (20) producing a continuous pressure associated with said inlet duct and with a storage space (28), an air control valve (34) coupled with said inlet duct between the storage space (28) and each inlet valve (14), said air control valve opens and closes in a way dependent on the ignition frequency of the associated combustion chambers (10), means for modifying the phase position of the inlet valve (14) and the air control valve (34), said means for modifying phase associated with said inlet valve and air control valve for shifting opening of said valves such that a supply of compressed air is concentrated at the start of opening of the inlet valve, compressed air is supplied during full opening of the inlet valve, or compressed air is concentrated at the closing of the inlet valve, and means for supplying non-compressed air to said at least one combustion chamber when said air control valve is closed, said means for supplying non-compressed air bypasses a compress branch of said duct including the charger, storage space and air control valve, and is coupled with said inlet duct, said means for supplying non-compressed air is able to be shut off by a valve means (38) when said air control valve is opened.

2. The IC engine as claimed in claim 1, characterized in that each inlet valve (14) is connected with said means for supplying non-compressed air bypassing the compressor branch.

3. The IC engine as claimed in claim 1 or claim 2, characterized in that the duration of opening of the air control valve (34) is able to be adjusted.

4. The IC engine as claimed in claim 1 or claim 2, characterized in that the device for modifying the phase position consists of a computer (42), whose inputs (48, 52 and 56) are connected with a program memory (44) and sensors (50 and 54) to respond to operational parameters of the engine and/or at least one control member (46) for the input of control commands and whose output is connected with a servo means for the air control valve (34).

5. The IC engine as claimed in claim 1 or claim 2, characterized in that the inlet side (24) of the charger (20) and the duct (40) bypassing same are connected together upstream from the valve (38) shutting off this duct (40).

6. The IC engine as claimed in claim 1 or claim 2, characterized in that the phase relationship of the inlet valve (14) and of the air control valve (34) is able to be steplessly adjusted.

7. The IC engine as claimed in claim 1 or claim 2, characterized in that the duration of opening of the air control valve (34) is at the most equal to the duration of opening of the air inlet valve (14).

8. The IC engine as claimed in claim 4, characterized in that the program memory contains selectable programs.

9. The IC engine as claimed in claim 4, characterized in that the sensors (50 and 54) are arranged on the combustion chamber (10) and/or on the storage space (28) and are able to respond to the operation state of the engine and, respectively, the pressure and temperature in the storage space (28).

10. The IC engine as claimed in claim 4, characterized in that the control member is an accelerator pedal (46) of a motor vehicle.

11. The IC engine as claimed in claim 1, characterized in that the air control valve comprises a rotor (62) which is enclosed within a valve housing (60), is designed in the form of a body of revolution, is able to be driven continuously by the rotation of the engine crank shaft and is provided with a connecting duct (64) opening towards the housing, the connecting duct (64) in the valve housing (60) being provided with ports (66 and 68), arranged in sequence in the direction of rotation, for the storage space (28) and the inlet duct (36).

12. The IC engine as claimed in claim 1, characterized in that in the case of a four cylinder in-line four stroke engine there are three inlet ducts (36a, 36b and 36c), of which one inlet duct (36b) is associated jointly with the two middle cylinders.

13. The IC engine as claimed in claim 11, characterized in that the phase relationship between the valve opening times and the crank shaft may be modified by adjusting the rotor (62) in relation to the valve housing (60).

14. The IC engine as claimed in claim 1, characterized in that a charging air cooler (30) is arranged upstream from the air control valve (34).

15. The IC engine as claimed in claim 1, characterized in that said valve means (38) permits a flow only towards the inlet valve (14).

16. The IC engine as claimed in claim 1, characterized in that said valve means is able to be shut off in a way dependent on the position of the air control valve (34).

17. The IC engine as claimed in claim 2, characterized in that each inlet valve (14) is provided with a valve (38) shutting off the connection with the duct (40) bypassing the compressor branch (20, 28 and 34).

18. The IC engine as claimed in claim 17 characterized in that the valve (38a; 38d; and 38e) which is associated with the inlet duct (36a; 36d; and 36e) and bypasses the connection with the compressor branch (20, 38 and 34), the associated air control valve (34a; 34d; and 34e) and the inlet valve or, respectively, the inlet valves (14a, 14d; 14b and 14c) of the associated combustion chambers (10a; 10d; 10b and 10c) are located in close proximity to each other.

19. The IC engine as claimed in claim 15, characterized in that the air control valves (34a, 34b, 34c and 34d) of at least one set of inlet ducts (36a, 36b, 36c and 36d) of an engine possess a common, tubular rotor (62f) mounted for rotation in a tubular housing (60f) and able to be in step with the crank shaft rotation, and the inner space (160) of such rotor is connected with the storage space (28), in that on the housing (60f) the inlet ducts (36a, 36b, 36c and 36d) open with an offset in the axial direction, in that for each inlet duct (36a, 36b, 36c and 36d) on the rotor (62f) there is a valve port (64a, 64b, 64c and 64d), and these ports (64a through 64d) are offset in accordance with the ignition sequence in the peripheral direction, and in that the phase relationship between the rotor (62f) and the crank shaft may be adjusted.

20. The IC engine as claimed in claim 15, characterized in that the frequency of opening of the air control valve (34) corresponds to the ignition frequency of the engine or a multiple thereof.

21. The IC engine as claimed in claim 15, characterized in that the distance between the opening times of the air control valve (34) is able to be changed between the opening times of the inlet valve (14) of the engine and a multiple thereof.

22. The IC engine as claimed in claim 16, characterized in that the means for supplying non-compressed air bypassing the compressor branch (20, 28 and 34) includes a valve (62 and 70) able to be actuated jointly with the air control valve (62 and 66).

23. The IC engine as claimed in claim 16, characterized in that the valve (62 and 70) and the air control valve (62 and 66) are combined together as a multiway valve.

24. The IC engine as claimed in claim 23, characterized by two rotors (130 and 132) which are designed as bodies of revolution, are able to be driven continuously in a way dependent on the rotation of the engine crank shaft and are rotatably mounted in a valve housing (138), and a connection duct (134) in its open state connects ports (140 and 142) for the storage space (28) and the inlet duct (36) and the other connecting duct (136) in its open stage connects an inlet (144) and an outlet (146) for the means for supplying non-compressed air bypassing the compressor branch (20, 28 and 34), the mutual phase relationship of the rotors (130 and 142) is adjustable and the phase relationship between the valve opening times and the engine crank shaft is able to be adjusted by adjustment of the rotors (130 and 132) in relation to the valve housing (138).

25. The IC engine as claimed in claim 23, characterized in that the multiway valve is a three-way valve, whose ports (66, 68 and 70) are connected with the storage space (28), the inlet duct (36) and the means for supplying non-compressed air.

26. The IC engine as claimed in claim 25, characterized in that an opening port edge (72; and 122) of the connection (66, 64 and 68) between the storage space (28) and the inlet duct (36) is able to be adjusted.

27. The IC engine as claimed in claim 25, characterized in that the multiway valve comprises a rotor (62) which is enclosed within a valve housing (60), is designed in the form of a body of revolution, is able to be driven continuously in accordance with the rotation of the engine crank shaft, and is provided with a connection duct (64) opening towards the housing, the connecting duct (64) in the valve housing being in sequence associated with ports (66, 68 and 70) for the storage space (28), the inlet duct (36) and the means for supplying non-compressed air bypassing the compressor branch (20, 28 and 34) and the port for the means for supplying non-compressed air bypassing compressor branch contains a shut off means.

28. The IC engine as claimed in claim 25, characterized in that the closing port edge (123) of the connection (66, 64 and 68) between the storage space (28) and the inlet duct (36) is adjustable.

29. The IC engine as claimed in claim 25, characterized in that the maximum speed of rotation of the rotor (62) is such that for two strokes of the associated engine cylinder or the associated engine cylinders there is in each case one valve opening.

30. The IC engine as claimed in claim 29, characterized in that the speed of rotation of the rotor (62) is able to be halved freely in steps.

31. The IC engine as claimed in claim 28, characterized in that the opening edge (122) and the closing port edge (123) of the connection (66, 64 and 68) between the storage space (28) and the inlet duct (26) are able to be independently adjusted.

32. The IC engine as claimed in claim 27, characterized in that the shut off means is a directional valve for preventing backflow.

33. The IC engine as claimed in claim 27, characterized in that a closing port edge (76) of the connection between the means for supplying non-compressed air and the inlet duct is adjustable.

34. The IC engine as claimed in claim 27, characterized in that an opening port edge (74) of the connection (70, 64 and 68) between the means for supplying non-compressed air bypassing the compressor branch (20, 28 and 34) and the inlet duct (36) is adjustable.

* * * * *

UNITED STATES PATENT AND TRADEMARK OFFICE
CERTIFICATE OF CORRECTION

PATENT NO. : 4,928,648

DATED : May 29, 1990

INVENTOR(S) : Oskar Schatz, et al.

It is certified that error appears in the above-identified patent and that said Letters Patent is hereby corrected as shown below:

On the title page:

U.S. Patent Documents: 4,452,203 "1/1984" should be --6/1984--;

U.S. Patent Documents: "4,704,682" should be --4,709,682--;

U.S. Patent Documents: 4,796,584 "Gato" should be --Goto--;

Col. 1, Line 41, "a considerably" should be --considerable--;

Col. 2, Line 22, delete "the" after --for--;

Col. 3, Line 50, "respectively" should be --respective--;

Col. 4, Line 59, after "ensure" insert --more--;

Col. 5, Line 1, "engine" should be --opening--;

Col. 6, Line 65, "advantage" should be --advantages--;

Col. 7, Line 22, insert "of" before --an--;

Col. 7, Line 63, "charger" should be --storage means--;

Col. 8, Line 24, "connection 56" should be --connection 52--;

Col. 8, Line 55, "valve" should be --valves--;

Col. 9, Line 1, "cylinder" should be --cylinders--;

Col. 9, Line 25, after "well" insert --as--;

Col. 9, Line 35, delete "in" after --between--;

Col. 10, Line 64, after "outer" insert --baffle--;

Col. 10, Line 65, "102" should be --120--;

UNITED STATES PATENT AND TRADEMARK OFFICE
CERTIFICATE OF CORRECTION

PATENT NO. : 4,928,648

DATED : May 29, 1990

INVENTOR(S) : Oskar Schatz, et al.

It is certified that error appears in the above-identified patent and that said Letters Patent is hereby corrected as shown below:

Col. 11, Line 9, delete "charging" after --precharging--;

Col. 11, Line 15, "valve 66" should be --valve 34--;

Col. 11, Line 24, "62n" should be --62--;

Col. 12, Line 13, after "well" insert --as--;

Col. 12, Line 31, "130a" should be --130--;

Col. 12, Line 36, "130a" should be --130--;

Col. 13, Line 11, after "well" insert --as--;

Col. 13, Line 17, after "well" insert --as--;

Col. 13, Line 46, "branch" should be --branches--;

Col. 14, Line 9, "the" (2nd occurrence) should be --for--;

Col. 15, Line 66, Claim 18, "38" should be --28--;

Col. 16, Line 9, Claim 19, after "be" insert --driven--.

Signed and Sealed this

Fourteenth Day of July, 1992

*Attest:*

DOUGLAS B. COMER

*Attesting Officer*  *Acting Commissioner of Patents and Trademarks*